(12) United States Patent
Price (10) Patent No.: US 11,407,183 B2
(45) Date of Patent: Aug. 9, 2022

(54) ADDITIVELY MANUFACTURED OBJECTS WITH PRE-FORMED BONDING FEATURES AND METHODS OF MAKING THE SAME

(71) Applicant: Carbon, Inc., Redwood City, CA (US)

(72) Inventor: R. Griffin Price, Redwood City, CA (US)

(73) Assignee: Carbon, Inc., Redwood City, CA (US)

( * ) Notice: Subject to any disclaimer, the term of this patent is extended or adjusted under 35 U.S.C. 154(b) by 189 days.

(21) Appl. No.: 16/547,706

(22) Filed: Aug. 22, 2019

(65) Prior Publication Data

US 2020/0070430 A1 Mar. 5, 2020

Related U.S. Application Data

(60) Provisional application No. 62/725,402, filed on Aug. 31, 2018.

(51) Int. Cl.
*B29C 65/00* (2006.01)
*B33Y 80/00* (2015.01)
*B29C 65/14* (2006.01)

(52) U.S. Cl.
CPC .... *B29C 66/30325* (2013.01); *B29C 65/1425* (2013.01); *B33Y 80/00* (2014.12)

(58) Field of Classification Search
CPC ................ H05K 3/284; H05K 3/4007; H05K 2203/1316; H05K 2203/1327;
(Continued)

(56) References Cited

U.S. PATENT DOCUMENTS 5,236,637 A 8/1993 Hull
5,391,072 A 2/1995 Lawton
(Continued)

FOREIGN PATENT DOCUMENTS

WO 2015195924 12/2015
WO 2016007495 1/2016
(Continued)

OTHER PUBLICATIONS

Cibatool MSDS, Ciba Specialty Chemicals Corporation North America, Jul. 1998, http://www.3dsystems.ru/global/files/materials/5170.pdf. (Year: 1998).*
(Continued)

*Primary Examiner* — Michael N Orlando
*Assistant Examiner* — Christopher W Raimund
(74) *Attorney, Agent, or Firm* — Myers Bigel, P.A.

(57) ABSTRACT

The present disclosure describes a three-dimensional object. The three-dimensional object includes a light polymerized body, at least one internal chamber residing within the light polymerized body, the at least one internal chamber having at least one frangible wall, and a curable component contained within the at least one internal chamber. The three-dimensional object may further include at least one channel extending inwardly from an outer surface of the light polymerized body toward the internal chamber and at least a portion of the at least one channel being adjacent to the at least one frangible wall of the at least one internal chamber. Methods of bonding an insertable object to a three-dimensional object and kits are also described.

17 Claims, 3 Drawing Sheets

(58) Field of Classification Search
CPC ........ H05K 2203/1361; B29C 45/1671; B29C 45/14639; B29C 41/14; A61N 1/0551; B29K 2075/00; B29L 2031/3425
See application file for complete search history.

(56) References Cited

U.S. PATENT DOCUMENTS

| | | | |
|---|---|---|---|
| 5,529,473 A | 6/1996 | Lawton | |
| 7,438,846 B2 | 10/2008 | John | |
| 7,892,474 B2 | 2/2011 | Shkolnik | |
| 8,110,135 B2 | 2/2012 | El-Siblani | |
| 8,535,779 B1 | 9/2013 | Smith | |
| 8,574,704 B2 | 11/2013 | Smith | |
| 9,205,601 B2 | 12/2015 | Desimone | |
| 9,211,678 B2 | 12/2015 | Desimone | |
| 9,216,546 B2 | 12/2015 | Desimone | |
| 9,360,757 B2 | 6/2016 | Desimone | |
| 9,453,142 B2 | 9/2016 | Rolland | |
| 9,498,920 B2 | 11/2016 | Desimone | |
| 9,598,606 B2 | 3/2017 | Rolland | |
| 9,676,963 B2 | 6/2017 | Rolland | |
| 2003/0203158 A1* | 10/2003 | Farnworth | G11B 5/5552 428/137 |
| 2011/0060373 A1* | 3/2011 | Russell | A61B 17/8057 606/304 |
| 2011/0152863 A1* | 6/2011 | Lutz | A61B 17/72 606/64 |
| 2011/0202091 A1* | 8/2011 | Trieu | A61B 17/866 606/279 |
| 2013/0292862 A1 | 11/2013 | Joyce | |
| 2013/0295212 A1 | 11/2013 | Chen | |
| 2014/0290478 A1 | 10/2014 | Liu | |
| 2016/0046075 A1 | 2/2016 | Desimone | |
| 2016/0193786 A1 | 7/2016 | Moore | |
| 2016/0200052 A1 | 7/2016 | Moore | |
| 2017/0129169 A1 | 5/2017 | Batchelder | |
| 2017/0173872 A1* | 6/2017 | McCall | B33Y 10/00 |

FOREIGN PATENT DOCUMENTS

| | | |
|---|---|---|
| WO | 2016123499 | 8/2016 |
| WO | 2016123506 | 8/2016 |
| WO | 2016140886 | 9/2016 |
| WO | 2016149014 | 9/2016 |
| WO | 2016149097 | 9/2016 |

OTHER PUBLICATIONS

Janusziewicz et al., "Layerless Fabrication with Continuous Liquid Interface Production", Proc. Nat'l. Acad. Sci. USA, vol. 113, No. 42, Oct. 18, 2016, pp. 11703-11708.

Tumbleston et al., "Continuous Liquid Interface Production of 3D Objects", Science, 347, Mar. 20, 2015, pp. 1349-1352.

* cited by examiner

FIG. 2A (PRESS IN & REMOVE PLUG)

FIG. 2B (BAKE)

ADDITIVELY MANUFACTURED OBJECTS WITH PRE-FORMED BONDING FEATURES AND METHODS OF MAKING THE SAME

RELATED APPLICATIONS

This application claims priority from and the benefit of U.S. Provisional Application Ser. No. 62/725,402, filed Aug. 31, 2018, the disclosure of which is hereby incorporated herein in its entirety.

FIELD OF THE INVENTION

The present invention concerns additive manufacturing, and more particularly additively manufactured three-dimensional objects with pre-formed bonding features and methods of making the same.

BACKGROUND OF THE INVENTION

A group of additive manufacturing techniques sometimes referred to as "stereolithography" create a three-dimensional object by the sequential polymerization of a light polymerizable resin. Such techniques may be "bottom-up" techniques, where light is projected into the resin on the bottom of the growing object through a light transmissive window, or "top down" techniques, where light is projected onto the resin on top of the growing object, which is then immersed downward into the pool of resin.

The recent introduction of a more rapid stereolithography technique known as continuous liquid interface production (CLIP), coupled with the introduction of "dual cure" resins for additive manufacturing, has expanded the usefulness of stereolithography from prototyping to manufacturing (see, e.g., U.S. Pat. Nos. 9,211,678; 9,205,601; and 9,216,546 to DeSimone et al.; and also in J. Tumbleston, D. Shirvanyants, N. Ermoshkin et al., Continuous liquid interface production of 3D Objects, *Science* 347, 1349-1352 (published online 16 Mar. 2015); see also Rolland et al., U.S. Pat. Nos. 9,676,963, 9,453,142 and 9,598,606).

Techniques such as CLIP harness inhibitors of polymerization such as oxygen to the benefit of the stereolithography process. However, the inhibitors can be consumed, and when consumed must be re-supplied, particularly when the process is operated rapidly. And rapid operation of the process can lead to seemingly unrelated additional problems, such as cavitation and bubble formation in the polymerizable liquid beneath the growing three-dimensional object, leading to defect formation within the object itself. Accordingly, a need remains for new techniques in bottom-up stereolithography.

SUMMARY OF THE INVENTION

In some embodiments, a three-dimensional object includes a light polymerized body, at least one internal chamber residing within the light polymerized body, the at least one internal chamber having at least one frangible wall, and a curable component contained within the at least one internal chamber.

In some embodiments, the three-dimensional object further includes at least one channel extending inwardly from an outer surface of the light polymerized body toward the internal chamber and at least a portion of the at least one channel being adjacent the at least one frangible wall of the at least one internal chamber.

In some embodiments, the curable component is curable by exposure to heat, microwave irradiation, or combinations thereof.

In some embodiments, the at least one frangible wall is configured to be broken by an insertable object such that the insertable object makes contact with the curable component contained within the internal chamber.

In some embodiments, the light polymerized body is further curable such that when the insertable object is in the internal chamber, the curable component and the light polymerized body form a solid unitary member bonded to the insertable object.

In some embodiments, the insertable component has an orifice formed therein.

In some embodiments, the insertable component further includes a removeable plug in the orifice.

In some embodiments, the at least one channel is sized and configured to form an interference fit or a threaded fit with the insertable object.

In some embodiments, the curable component comprises epoxy.

In some embodiments, the three-dimensional object includes two internal chambers, each internal chamber having at least one frangible wall and a curable component encapsulated therein, and at least a portion of the at least one channel is adjacent the at least one frangible wall of both internal chambers.

In some embodiments, the three-dimensional object includes two channels, each channel extending inwardly from an opposite outer surface of the light polymerized body toward the internal chamber, and the internal chamber includes two frangible walls and at least a portion of each channel is adjacent a respective frangible wall.

In some embodiments, the three-dimensional object comprises an electrical connector, an electronic device housing, a biomedical device, a mechanical device housing, a bushing or gasket, or a fastener.

In some embodiments, the three-dimensional object is produced from a polymerizable resin consisting of the curable component by the process of bottom-up or top-down stereolithography.

In some embodiments, the light polymerized body, the at least one frangible wall, and the curable component are formed from a single polymerizable liquid.

In some embodiments, a method of bonding an insertable object to a three-dimensional object includes providing the three-dimensional object as described above, inserting an insertable object into the at least one channel and breaking through the at least one frangible wall of the at least one internal chamber, contacting the insertable object with the curable component contained within the internal chamber; and curing the curable component and the light polymerized body to bond the insertable object to the three-dimensional object.

In some embodiments, curing the curable component and the light polymerized body comprises exposing the curable component and the light polymerized body to heat, microwave irradiation, or combinations thereof.

In some embodiments, the insertable object includes a removeable plug, and the method further includes removing the removeable plug from the insertable object after the insertable object is inserted into the at least one channel and has broken through the at least one frangible wall of the at least one internal chamber.

In some embodiments, the three-dimensional object includes two channels, and the method further includes inserting a second insertable object into the second channel and breaking through the at least one frangible wall of the at least one internal chamber.

In some embodiments, a three-dimensional object is produced by the methods described above.

In some embodiments, a kit includes an insertable object and a three-dimensional object. The three-dimensional object includes a light polymerized body, at least one internal chamber residing within the light polymerized body, the at least one internal chamber having at least one frangible wall, at least one channel extending inwardly from an outer surface of the light polymerized body toward the at least one internal chamber and at least a portion of the at least one channel being adjacent to the at least one frangible wall, and a curable component encapsulated within the at least one internal chamber. The three-dimensional object, the curable component, and the insertable object are configured to be cured and bonded together when the insertable object is inserted in the at least one channel such that the frangible wall is broken and the insertable object is in in contact with the curable component in the at least one internal chamber.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF ILLUSTRATIVE EMBODIMENTS

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity. Where used, broken lines illustrate optional features or operations unless specified otherwise.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

1. Additive Manufacturing Methods and Apparatus.

Additive manufacturing apparatus and methods are known. Suitable apparatus includes bottom-up apparatus that employ a window, or optically transparent member or "build plate," on which a pool of polymerizable liquid sits, and through which patterned light is projected to produce a three-dimensional object. Such methods and apparatus are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and U.S. Patent Application Publication No. 2013/0295212 to Chen et al. The disclosures of these patents and applications are incorporated by reference herein in their entirety.

CLIP is known and described in, for example, U.S. Pat. Nos. 9,211,678; 9,205,601; and 9,216,546 to DeSimone et al.; and also in J. Tumbleston, D. Shirvanyants, N. Ermoshkin et al., Continuous liquid interface production of 3D Objects, *Science* 347, 1349-1352 (published online 16 Mar. 2015). See also R. Janusziewcz et al., Layerless fabrication with continuous liquid interface production, *Proc. Natl. Acad. Sci. USA* 113, 11703-11708 (Oct. 18, 2016). In some embodiments, CLIP employs features of a bottom-up three-dimensional fabrication as described above, but the irradiating and/or the advancing steps are carried out while also concurrently maintaining a stable or persistent liquid interface between the growing object and the build surface or window, such as by: (i) continuously maintaining a dead zone of polymerizable liquid in contact with the build surface, and (ii) continuously maintaining a gradient of polymerization zone (such as an active surface) between the dead zone and the solid polymer and in contact with each thereof, the gradient of polymerization zone comprising the first component in partially cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. The particular manner of description is not critical, and the present invention can be used in any of a variety of systems that employ a semipermeable build plate, through which an inhibitor of polymerization passes, whether explicitly referred to as "CLIP" or not.

The apparatus can include a local controller that contains and executes operating instructions for the production of a three-dimensional object on that apparatus, typically from an object data file entered into the controller by the user. Along with the basic three-dimensional image of the object that is typically projected for photopolymerization (along with movement of the carrier and build surface away from one another in the Z direction), the operating instructions can include or generate process parameters such as: light intensity; light exposure duration; inter-exposure duration; speed of production; step height; height and/or duration of upstroke in a stepped or reciprocal operating mode; height and/or duration of downstroke in a reciprocal operating mode; rotation speed for pumping viscous polymerizable liquid; resin heating temperature; and/or resin cooling temperature; rotation speed and frequency, etc. (see, e.g., Ermoshkin et al., Three-dimensional printing with reciprocal feeding of polymerizable liquid PCT Patent Application Publication No. WO 2015/195924 (published 23 Dec. 2015); Sutter et al., Fabrication of three dimensional objects with multiple operating modes, PCT Patent Application Publication No. WO 2016/140886 (published 9 Sep. 2016); J. DeSimone et al., Methods and apparatus for continuous liquid interface production with rotation, PCT Patent Application WO 2016/007495 (published 14 Jan. 2016); see also J. DeSimone et al., U.S. Pat. No. 9,211,678, and J. Batchelder et al., Continuous liquid interface production system with viscosity pump, U.S. Patent Application Publication No. US 2017/0129169 (published 11 May 2017).

In one non-limiting embodiment, the apparatus may be a Carbon Inc., M1 or M2 additive manufacturing apparatus, available from Carbon, Inc., 1089 Mills Way, Redwood City, Calif. 94063 USA.

In some embodiments, the resin is a dual cure resin, such as a resin comprising at least one light polymerizable constituent, and at least one heat polymerizable constituent (that is a constituent different from the light polymerizable constituent). Such resins are described in, for example, Rolland et al., U.S. Pat. Nos. 9,676,963; 9,598,606; and 9,453,142, the disclosures of which are incorporated herein by reference.

Resins may be in any suitable form, including "one pot" resins and "dual precursor" resins (where cross-reactive constituents are packaged separately and mixed together before use, and which may be identified as an "A" precursor resin and a "B" precursor resin).

Particular examples of suitable resins include, but are not limited to, Carbon, Inc. rigid polyurethane resin (RPU), flexible polyurethane resin (FPU), elastomeric polyurethane resin (EPU), cyanate ester resin (CE), or epoxy resin (EPX), all available from Carbon, Inc., 1089 Mills Way, Redwood City, Calif. 94063 USA.

2. Window Cassettes.

In general, a window cassette or build plate for use in the present invention may comprise any suitable semipermeable or permeable material (that is, permeable to the polymerization inhibitor) including amorphous fluoropolymers, such as an amorphous thermoplastic fluoropolymer like TEFLON AF 1600™ or TEFLON AF 2400™ fluoropolymer films, or perfluoropolyether (PFPE), particularly a crosslinked PFPE film, or a crosslinked silicone polymer film Beneath that may be a fluid bed layer, such as provided by a gas permeable material, optionally containing channels or cavities, such as a permeable polymer (e.g., poly(dimethylsiloxane) (PDMS). A base or support member (such as glass or sapphire) may be included at the bottom of the window if necessary, and may serve to further define the fluid supply bed. The build plate may be supported by a peripheral frame, with the two together forming a removable window cassette as discussed below.

In some embodiments, the pressure and gas supply to the build plate may be controlled to reduce bubble or voids formed by excess gasses, such as nitrogen, in the polymerizable fluid (e.g., resin) of in the 3D printing process and apparatus. Although the methods described herein may be performed by controlling a pressure and/or content of the gas supplied to the build plate using a pressure controller/gas supply, it should be understood that any suitable system may be used, including alternative build plates. For example, any permeable build plate may be positioned such that the side opposite the build surface is in a pressure-controlled chamber, or any suitable configuration of pressure-pressure controlled channels may be used.

The amount and duration of the reduced pressure applied to the polymerizable liquid through the optically transparent member is preferably sufficient to reduce a gas concentration in the polymerizable liquid. The pressure may be at 0%, 5%, 10%, 20%, 25%, 30%, 40% to 50%, 60%, 70%, 80%, 90% or 100% of atmospheric pressure. The oxygen or polymerization inhibitor gas composition of the gas supplied may be 20%, 25%, 30%, 40% to 50%, 60%, 70%, 80%, 90% or 100% oxygen.

In some embodiments, the polymerizable fluid has a gradient of gas concentration, which determines an amount of irradiation or "dose" to cure the polymerizable liquid. For example, the polymerizable fluid can have a lower region on the optically transparent member and an upper region on the lower region opposite the optically transparent member such that the lower region has a higher dose to cure than the upper region. The applied reduced pressure to the polymerizable liquid through the optically transparent member may reduce a gas concentration in the upper region, while maintaining the polymerization inhibitor gas in the lower region, which consequently reduces a thickness of the dead zone. In some embodiments, the thickness of the lower region is less than about 1000 microns or between about 1, 2, 5, 10, 20 50, 100, 200 300 to 400, 500, 600, 700, 800, 900 or 1000 microns.

In some embodiments, oxygen gas may be used as the polymerization inhibitor. Oxygen may be supplied at any suitable pressure, and is preferably supplied at a pressure that is less than atmospheric pressure. In particular embodiments, the pressure of the oxygen is substantial equal to a partial pressure of oxygen in air at atmospheric pressure (e.g., 100% oxygen supplied at about 0.2 atm). The polymerization inhibitor gas may also be substantially devoid of nitrogen or other gases that do not substantially contribute to polymerization inhibition in the dead zone.

Without wishing to be bound by any particular theory, resins that are saturated with gas are prone to degassing when the local pressure drops. Large pressure drops can occur during the build platform movement and resin refill. When the separation of the printed part and window result in gas coalescence, voids may be formed in the printed part. Accordingly, controlling the pressure of a gas or applying a vacuum through the gas permeable build plate may reduce the level of dissolved gases prior to the pressure change and reducing an amount of dissolved gas may increase the pressure differential that the resin can experience prior to void formation. The build plate is permeable to gasses, and equilibrium may be established at the build plate/resin interface relatively quickly. Cycling between air (or oxygen) and vacuum for printing formation and part movement, respectively, may permit the CLIP process to be performed with a maximum pressure differential on the resin prior to void formation the part. Moreover, the removal of nitrogen, which is not an active component of polymerization inhibition, may reduce the overall gas level and further reduce the formation of bubbles or voids in the printed part.

In addition, while oxygen delivery to the interface between the polymerizable fluid and the build plate is desirable, oxygen in the regions of the polymerization fluid that are further away from the interface may lead to a larger dosage of irradiation to cure the polymerizable fluid, which results in a longer exposure time and slower print speeds. Reducing the overall oxygen level may lead to faster cure times, by may lead to difficulty maintaining sufficient oxygen at the interface for the CLIP process to be effective. Moreover, since the light intensity decays as it passes through the polymerization fluid, the percent monomer to polymer conversions may not be constant throughout the exposed region. Controlling a level of oxygen concentration may reduce exposure times and increase print speeds by effectively maintaining a level of oxygen at the build plate and polymerization fluid interface. The oxygen concentration profile may also be controlled to provide more consistent percent monomer to polymer conversions in view of variations of light intensity.

Additional Build Plate Materials.

Any suitable material may be used to form the build plates described herein, including multi-layer build plates and/or build plates formed of more than one material. For example, the flexible layer (used alone or with additional supports or layers) may include a woven glass fabric (fiberglass or e-glass) with a crosslinked silicone elastomeric coating (such as room temperature vulcanized (RTV) silicone), which may be lightly infiltrated into the glass fiber fabric to provide mechanical durability. The oxygen permeability of silicone elastomer (rubber) is similar to Teflon® AF-2400. Such a configuration may be used alone or affixed (adhesively adhered) to a glass plate with the unfilled areas of the fabric available for air (oxygen) flow. Sulfonated tetrafluoroethylene based fluoropolymer-copolymers, such as Nafion® from Dupont may also be used.

In some embodiments, asymmetric flat sheet membranes which are currently used in very high quantity for water purification applications (see U.S. Patent Publication No. 2014/0290478) may be used. These membranes are generally polysulfone or polyethersulfone, and may be coated with perfluoropolymers or crosslinked silicone elastomer to increase chemical resistance. Also poly(vinylidene fluoride) and possibly polyimide asymmetric (porous) membranes may be used, for example, if chemical resistance is a problem. Some of the membranes may be used as is without coatings. Examples of such membranes include FilmTec® membranes (Dow Chemical, Midland, Mich. (USA)). These are porous polysulfone asymmetric membranes coated with a crosslinked high Tg polyamide (with a coating thickness of about 0.1 microns). The crosslinked polyamide coating should provide chemical resistance. Although the oxygen permeability of the polyamide is low, the thickness of the coating may be so low that the effective oxygen transmission rate is high. The polysulfone support without the polyamide layer could be coated with a wide variety of polymers such as silicone rubber (or AF-2400) to yield very high oxygen transmission. The FilmTec® membranes are produced in very high quantity as they are the prime material used in water desalination plants. PVDF porous membranes may allow repeated use.

Although embodiments according to the present invention are described with respect to flexible layers on the build plate that include a semipermeable (or gas permeable) member (e.g., perfluoropolymers, such as TEFLON AF® fluoropolymers, it should be understood that any suitable flexible material may be used in the configurations described herein. For example, a transparent, resilient paper, such as glassine, may be used. Glassine is a relatively transparent, greaseproof paper formed of well-hydrated cellulosic fibers that has been super calendared. Glassine may be plasticized and/or coated with wax or a glaze. Glassine may be gas permeable. In some embodiments, the glassine may be coated with a thin layer of crosslinked silicone elastomer or a perfluoropolymer, such as TEFLON AF® fluoropolymers.

Glassine paper is substantially grease resistant, and may have limited adhesion to the polymerizable liquid described herein.

Build Plate Coatings.

Omniphobic surfaces may be used on the build plate surface or build region. For example, patterned surfaces (either a random array of particles or micro-patterned surfaces) that contain non-miscible fluids that are pinned or held to the surface by capillary forces may be used. Such a surface may result in fluid on the surface floating along the surface. Examples of such surfaces are described in U.S. Pat. Nos. 8,535,779 and 8,574,704, the disclosures of which are hereby incorporated by reference in their entireties.

Examples of build plates that can be modified based on the disclosure given herein for use in carrying out the present invention include, but are not limited to, those described in: U.S. Pat. No. 9,498,920 to J. DeSimone, A. Ermoshkin, and E. Samulski; U.S. Pat. No. 9,360,757 to J. DeSimone, A. Ermoshkin, N. Ermoshkin and E. Samulski; and U.S. Pat. No. 9,205,601 to J. DeSimone, A. Ermoshkin, N. Ermoshkin and E. Samulski; U.S. Patent Application Publication Nos. 2016/0046075 to J. DeSimone, A. Ermoshkin et al.; 2016/0193786 to D. Moore, A. Ermoshkin et al.; 2016/0200052 to D. Moore, J. Tumbleston et al.; PCT Patent Application Publication Nos. WO 2016/123499 to D. Moore, J. Tumbleston et al; WO 2016/123506 to D. Moore, J. Tumbleston et al.; WO 2016/149097 to J. Tumbleston, E. Samulski et al.; WO 2016/149014 to J. Tumbleston, E. Samulski et al.; and others (the disclosures of all of which are incorporated by reference herein in their entirety).

3. Example Products and Methods.

Figure 1A:
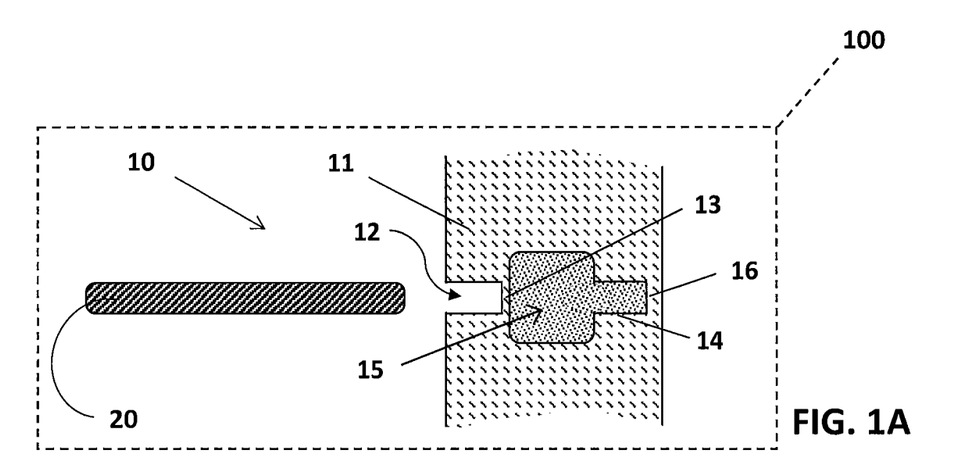
FIGS. 1A-1C illustrate an exemplary method of bonding an insertable component to a three-dimensional object according to embodiments of the present invention.
Figure 1B:
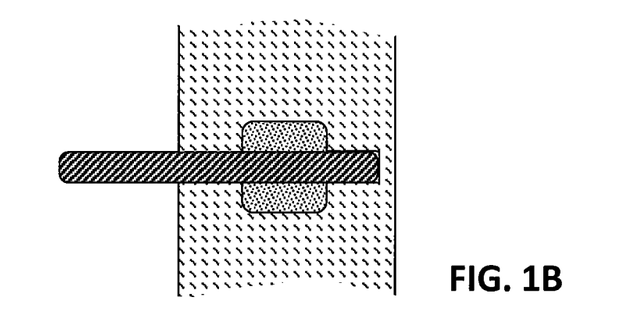
Figure 1C:
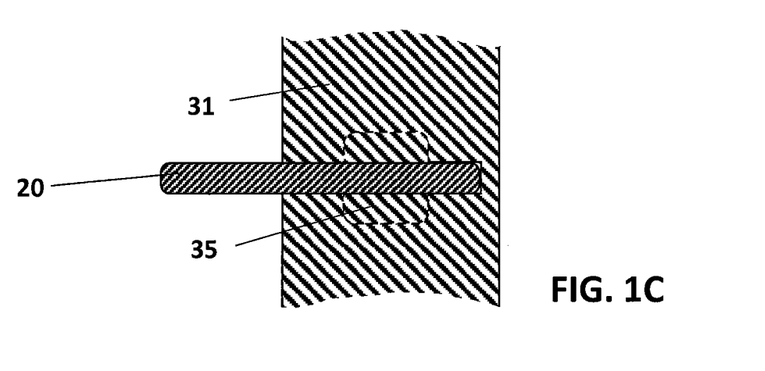
Figure 2A:
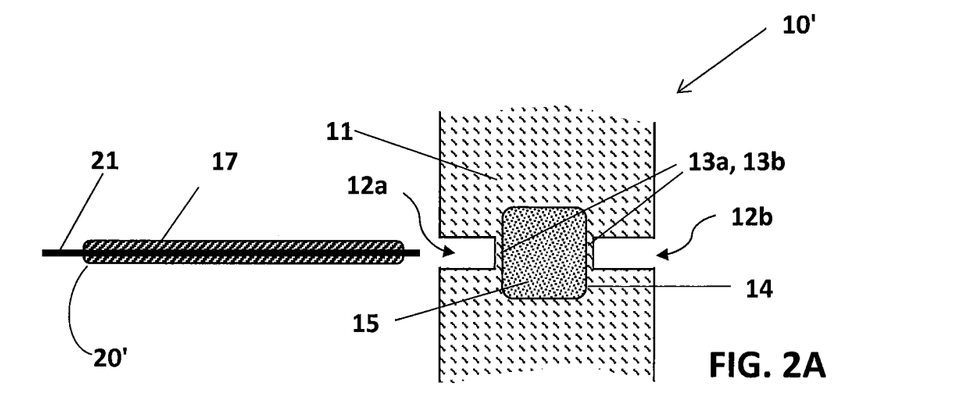
FIGS. 2A-2C illustrates an exemplary alternative method of bonding an insertable component to a three-dimensional object according to embodiments of the present invention.
Figure 2B:
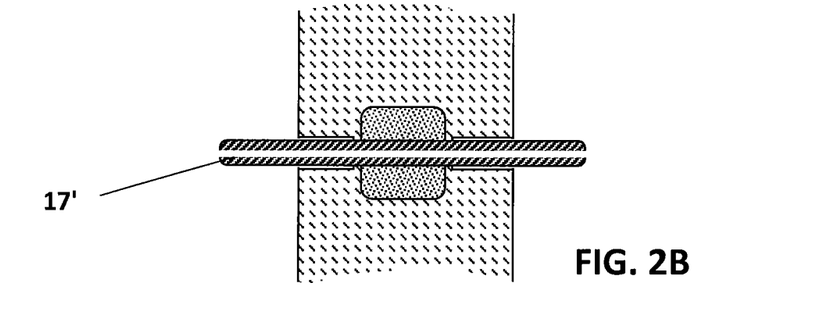
Figure 2C:
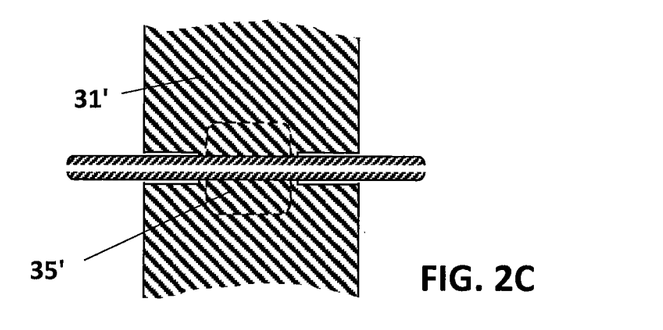
Figure 3A:
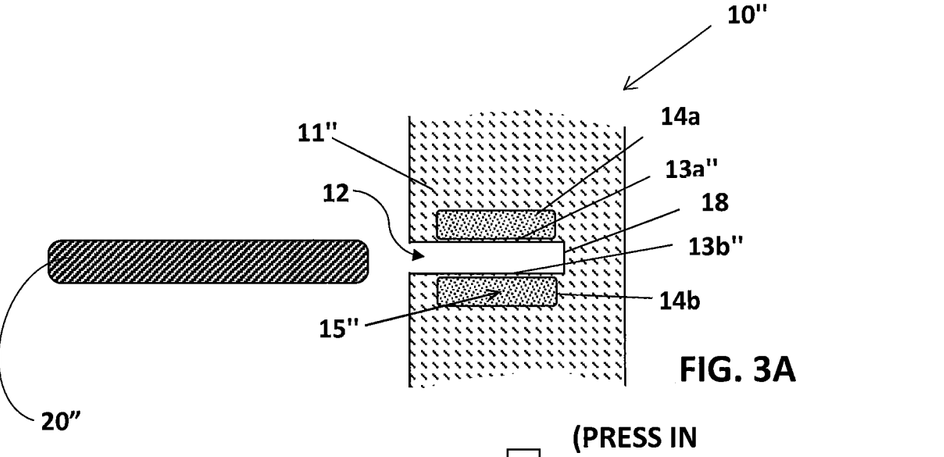
FIGS. 3A-3C illustrates an exemplary alternative method of bonding an insertable component to a three-dimensional object according to embodiments of the present invention.
Figure 3B:
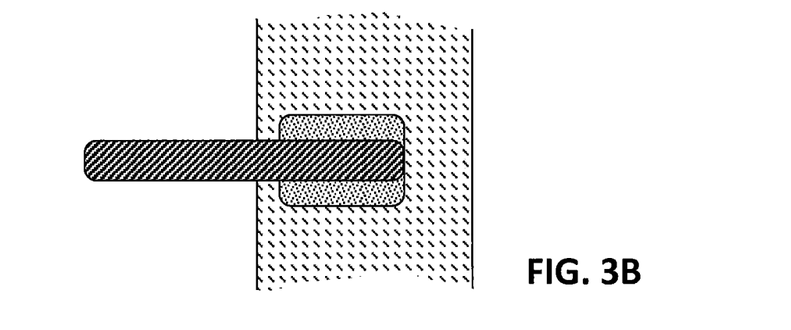
Figure 3C:
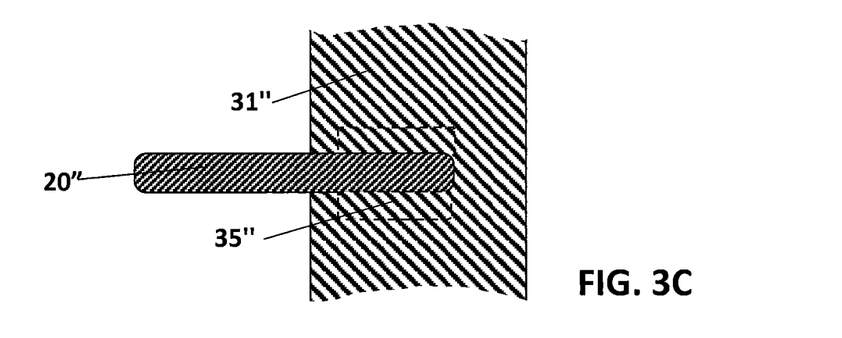

Referring now to the figures, three-dimensional objects with pre-formed bonding features and methods of bonding an insertable object to a three-dimensional object are illustrated in FIGS. 1-3.

Referring to FIGS. 1A-1C, in some embodiments, a three-dimensional object 10 may include a light polymerized body 11, at least one internal chamber 14, at least one frangible wall 13, and a curable component 15. In some embodiments, the light polymerized body 11 may be produced from a polymerizable resin consisting of the curable component 15 by the process of bottom-up or top down stereolithography. For example, in some embodiments, the at least one internal chamber 14 and curable component 15 may be produced by under-exposing the region defining the internal chamber 14 during said stereolithography.

As shown in FIG. 1A, the at least one internal chamber 14 resides within the light polymerized body 11 such that the internal chamber 14 is surrounded by the light polymerized body 11 of the three-dimensional object 10. In some embodiments, the three-dimensional object 10 may have more than one internal chamber 14. For example, the three-dimensional object 10 may have 1, 2, 3, 4 or more internal chambers 14.

The at least one internal chamber 14 has at least one frangible wall 13. In some embodiments, the internal chamber 14 may have more than one frangible wall 13 (see, e.g., FIG. 2A). For example, the internal chamber 14 may have 1, 2, 3, 4 or more frangible walls 13. In some embodiments, the frangible wall 13 of the internal chamber 14 may be adjacent to an outer surface of the light polymerized body 11.

In some embodiments, the curable component 15 is contained within the internal chamber 14. In some embodiments, the curable component 15 completely fills the at least one internal chamber 14. In some embodiments, the curable component 15 partial fills the internal chamber 14. The curable component 15 may be encapsulated or sealed within the internal chamber 14 to limit or prevent exposure to oxygen or air. In some embodiments, when sealed within the internal chamber 14, the curable component 15 is in a non-solidified state (i.e., uncured). The internal chamber 14 is devoid of apertures or vents to reduce or prevent exposure of the curable component 15 to oxygen, air, or light such that the curable component 15 remains in an uncured state until an affirmative curing step is taken.

In some embodiments, the curable component 15 and light polymerized body 11 are solidifiable or further reactable, polymerizable, or chain-extendable by exposure to heat, exposure to microwave irradiation, or combinations thereof. In some embodiments, the curable component 15 is a resin. In some embodiments, the curable component 15 may comprise an epoxy. In some embodiments, the light polymerized body 11, the at least one frangible wall 13, and/or the curable component 15 comprises a light polymerizable resin. In some embodiments, the light polymerized body 11, the at least one frangible wall 13, and/or the curable component 15 comprises a heat polymerizable resin. In some embodiments, the curable component 15 is a polymerizable fluid or liquid. In some embodiments, the curable component 15 may be a rigid resin (e.g., a rigid polyurethane resin). In some embodiments, the curable component 15 may be flexible and/or elastic.

In some embodiments, the three-dimensional object 10 may comprise a dual-cure resin. In some embodiments, the light polymerized body 11, the at least one frangible wall 13, and the curable component 15 may be formed from a single polymerizable liquid or resin. For example, in some embodiments, the light polymerized body 11, the at least one frangible wall 13, and the curable component 15 may be formed from a dual-cure polymerizable liquid comprised of both light polymerizable constituents and heat polymerizable constituents.

The light polymerized body 11 of the three-dimensional object 10 may further include at least one channel 12. The at least one channel 12 may extend inwardly from an outer surface of the three-dimensional object 10 toward the internal chamber 14. At least a portion of the channel 12 is adjacent to the at least one frangible wall 13 of the internal chamber 14. The channel 12 is sized to receive and provides a point of insertion for an insertable object 20 to be bonded to the three-dimensional object 10. The insertable object 20 may be rigid or flexible.

As illustrated in FIG. 1B, to bond an insertable object 20 to the three-dimensional object 10, the insertable object 20 is pushed, pressed, or otherwise inserted into the channel 12 until the insertable object 20 breaks through the at least one frangible wall 13 of the internal chamber 14. In some embodiments, the channel 12 may be sized or configured to form an interference (or friction) fit with the insertable object 20. In some embodiments, the insertable object 20 and the channel 12 may comprise threads and the insertable object 20 may be configured to form a threaded fit with the channel 12.

In some embodiments, the internal chamber 14 may have an end wall 16 opposite the the frangible wall 13. For example, the insertable object 20 may be pushed through (or screwed into) the channel 12, through the frangible wall 13, and into the internal chamber 14 until the insertable object 20 makes contact with the end wall 16 of the internal chamber 14. As the insertable object 20 enters into the internal chamber 14, the insertable object 20 makes contact with the curable component 15 contained within the internal chamber 14 and the curable component 15 surrounds at least a portion of the insertable object 20 within the internal chamber 14.

As shown in FIG. 1C, after at least a portion of the insertable object 20 is inserted into the internal chamber 14, the curable component 15 is solidified (i.e., cured) by exposing the three-dimensional object 10 to heat, microwave irradiation, or a combination of both. For example, as shown in FIG. 1C, the three-dimensional object 10 combined with the insertable object 20 are subjected to heat (e.g., baked). The exposure to heat cures the curable component 15 and further solidifies (or cures) the light polymerized body 11 of the three-dimensional object 10, thereby forming a solid unitary member. Once solidified (e.g., cured), the now cured component 35 bonds the insertable object 20 to the now cured, light polymerized body 31 of the three-dimensional object 10.

Referring now to FIGS. 2A-2C, in some embodiments, the internal chamber 14 of a three-dimensional object 10' may have two frangible walls 13a, 13b. As shown in FIG. 2A, the two frangible walls 13a, 13b may be on opposite sides of the internal chamber 14. The light polymerized body 11 of the three-dimensional object 10' may further have two channels 12a, 12b. The two channels 12a, 12b may each extend inwardly from opposite outer surfaces of the three-dimensional object 10' toward the internal chamber 14. At least a portion of each channel 12a, 12b is adjacent to a respective frangible wall 13a, 13b of the internal chamber 14. The channels 12a, 12b are sized to receive and provide points of insertion (and/or exit) for an insertable object 20' to be bonded to the three-dimensional object 10'. In some embodiments, the insertable object 20' may have an orifice 17 formed therein. In some embodiments, the insertable object 20' may comprise a removeable plug 21 in the orifice 17.

As illustrated in FIG. 2B, and similar to the discussion above with respect to FIG. 1B, according to some embodiments, to bond an insertable object 20' to the three-dimensional object 10', the insertable object 20' is pushed (or screwed) into one of the channels 12a until the insertable object 20' breaks through one of the frangible walls 13a of the internal chamber 14. As shown in FIG. 2B, the insertable object 20' may be continued to be pushed (or screwed) through the internal chamber 14 breaking through the second frangible wall 13b on the opposite end of the internal chamber 14. After breaking through the second frangible wall 13b, the insertable object 20' enters the second channel 12b. The insertable object 20' may be continued to be pushed (or screwed) through the second channel 12b until a portion of the insertable object 20' extends past the opposite outer surface of the three-dimensional object 10'. Like discussed above, when the insertable object 20' is pushed (or screwed) into the internal chamber 14, the insertable object 20' makes contact with the curable component 15 contained or encapsulated within the internal chamber 14 and the curable component 15 surrounds at least the portion of the insertable object 20'.

In some embodiments, if the insertable object 20' has a removeable plug 21, the removeable plug 21 may be removed once the insertable object 20' is inserted into the three-dimensional object 10'. Removal of the removeable plug 21 from the orifice 17 creates a passage (or channel) 17' through the three-dimensional object 10' (see, e.g., FIG. 2B). This could be useful in, but not limited to, medical applications, such as, for example, where the three-dimensional object 10' is a fluid port.

As shown in FIG. 2C, similar to the discussion above with respect to FIG. 1C, after at least a portion of the insertable object 20' is inserted into the internal chamber 14, the curable component 15 is solidified (i.e., cured) by exposure to heat, exposure to microwave irradiation, or a combination of both. For example, as shown in FIG. 2C, the three-dimensional object 10' combined with the insertable object 20' are subjected to heat (e.g., baked). The exposure to heat cures the curable component 15 and further solidifies (or cures) the light polymerized body 11 of the three-dimensional object 10'. Once solidified, the now cured component 35' bonds the insertable object 20' to the now cured, light polymerized body 31' of the three-dimensional object 10'.

Still referring to FIGS. 2A-2C, in some embodiments, two insertable objects 20' may be bonded to the three-dimensional object 10'. For example, one insertable object 20' may be pushed through one of the channels 12a until the insertable object 20' breaks through one of the frangible walls 13a and enters the internal chamber 14. A second insertable object 20' (not shown) may then be pushed through the other channel 12b until the second insertable object 20' breaks through the second frangible wall 13b and enters the internal chamber 14. Breaking through the frangible walls 13a, 13b place both insertable objects 20' in contact with the curable component 15 contained or encapsulated within the internal chamber 14. The curable component 15 surrounds at least a portion of each insertable object 20' within the internal chamber 14. When solidified/cured (e.g., by exposure to heat), the cured component 35' bonds both insertable objects 20' to the cured, light polymerized body 31' of the three-dimensional object 10'.

Referring now to FIGS. 3A-3C, in some embodiments, the three-dimensional object 10" may have two internal chambers 14a, 14b. Contained or encapsualed within each internal chamber 14a, 14b is the curable component 15". As shown in FIG. 3A, each internal chamber 14" may have at least one frangible wall 13a", 13b". As discussed above, the light polymerized body 11" of the three-dimensional object 10" may further include at least one channel 12. The at least one channel 12 extends inwardly from an outer surface of the three-dimensional object 10" between the two internal chambers 14a, 14b. At least a portion of the channel 12 is adjacent to the at least one frangible wall 13a", 13b" of each internal chamber 14a, 14b. In some embodiments, the channel 12 may have an end wall 18. The channel 12 is sized to receive and provides a point of insertion for an insertable object 20" to be bonded to the three-dimensional object 10".

As illustrated in FIG. 3B, to bond an insertable object 20" to the three-dimensional object 10", the insertable object 20" is pushed (or screwed) into the channel 12 until the insertable object 20" contacts the end wall 18 of the channel 12. As the insertable object 20" is being pushed through (or screwed into) the channel 12, the insertable object 20" breaks through the frangible walls 13a", 13b" of each internal chamber 14a, 14b releasing the curable component 15" from each internal chamber 14a, 14b. When the frangible walls 13a", 13b" of the internal chambers 14a, 14b are broken, the inserted portion of the insertable object 20" is surrounded by the curable component 15 from each internal chamber 14a, 14b.

As shown in FIG. 3C, after at least a portion of the insertable object 20" breaks the frangible walls 13a", 13b" of the internal chambers 14a, 14b, the insertable object 20" is in contact with the curable component 15" that was contained within the internal chambers 14a, 14b. The curable component 15" is solidified (i.e., cured) by exposure to heat, microwave irradiation, or a combination of both. For example, as shown in FIG. 3C, the three-dimensional object 10" combined with the insertable object 20" is subjected to heat (e.g., baked). The exposure to heat cures the the curable component 15" and further solidifies (or cures) the light polymerized body 11" of the three-dimensional object 10". Once solidified, the now cured component 35" bonds the insertable object 20" to the now cured, light polymerized body 31" of the three-dimensional object 10".

A kit 100 for bonding an insertable object 20 to a three-dimensional object 10 is also provided. In some embodiments, a kit 100 includes an insertable object 20 and a three-dimensional object 10. The three-dimensional object 10 may include a light polymerized body 11 at least one internal chamber 14 residing within the light polymerized body 11, the at least one internal chamber 14 having at least one frangible wall 13, at least one channel 12 extending inwardly from an outer surface of the light polymerized body 11 toward the at least one internal chamber 14 and at least a portion of the at least one channel 12 being adjacent to the at least one frangible wall 13 and a curable component 15 encapsulated within the at least one internal chamber 14. In some embodiments, the three-dimensional object 10, the curable component 15, and the insertable object 20 included in the kit are configured to be cured and bonded together when the insertable object 20 is inserted in the at least one channel 12 such that the frangible wall 13 is broken and the insertable object 20 is in in contact with the curable component 15 in the at least one internal chamber 14.

The above methods and structures may be used to bond a virtually unlimited number of products. Examples include, but are not limited to, medical devices and implantable medical devices and other applications requiring high biocompatibility, functional structures, microneedle arrays, fibers, rods, waveguides, micromechanical devices, microfluidic devices; fasteners; electronic device housings; electrical conductors; gears, propellers, and impellers; wheels, mechanical device housings; tools; structural elements; hinges including living hinges; boat and watercraft hulls and decks; wheels; bottles, jars and other containers; pipes, liquid tubes and connectors; foot-ware soles, heels, innersoles and midsoles; bushings, a-rings and gaskets; shock absorbers, funnel/hose assembly, cushions; shin guards, athletic cups, knee pads, elbow pads, foam liners, padding or inserts, helmets, helmet straps, head gear, shoe cleats, gloves, other wearable or athletic equipment, brushes, combs, rings, jewelry, buttons, snaps, fasteners, watch bands or watch housings, mobile phone or tablet casings or housings, computer keyboards or keyboard buttons or components, remote control buttons or components, auto dashboard components, buttons, dials, auto body parts, paneling, other automotive, aircraft or boat parts, cookware, bakeware, kitchen utensils, steamers and any number of other three-dimensional objects. Any of the above described structures can be combined to form three-dimensional objects including the three-dimensional formed products described above. These are examples only and any number of other three-dimensional objects can be formed using the methods and materials described herein.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A three-dimensional object, comprising:
a light polymerized body;
at least one internal chamber residing within the light polymerized body, the at least one internal chamber having at least one frangible wall;
a curable component contained within the at least one internal chamber; and
at least one channel extending inwardly from an outer surface of the light polymerized body toward the internal chamber and at least a portion of the at least one channel being adjacent to the at least one frangible wall of the at least one internal chamber,
wherein the light polymerized body is produced from a polymerizable resin consisting of said curable component by the process of bottom-up or top-down stereolithography,
wherein the at least one internal chamber and curable component are produced by under-exposing the region defining the internal chamber during said stereolithography.

2. The three-dimensional object of claim 1, wherein the curable component is curable by exposure to heat, microwave irradiation, or combinations thereof.

3. The three-dimensional object of claim 1, wherein the at least one frangible wall is configured to be broken by an insertable object such that the insertable object makes contact with the curable component contained within the internal chamber.

4. The three-dimensional object of claim 3, wherein the light polymerized body is further curable such that when the insertable object is in the internal chamber, the curable component and the light polymerized body form a solid unitary member bonded to the insertable object.

5. The three-dimensional object of claim 3, wherein the insertable component has an orifice formed therein.

6. The three-dimensional object of claim 5, wherein the insertable component further comprises a removeable plug in the orifice.

7. The three-dimensional object of claim 1, wherein the at least one channel sized and configured to form an interference fit or a threaded fit with the insertable object.

8. The three-dimensional object of claim 1, wherein the curable component comprises epoxy.

9. The three-dimensional object of claim 1, wherein the three-dimensional object comprises two internal chambers, each internal chamber having at least one frangible wall and a curable component encapsulated therein, wherein at least a portion of the at least one channel is adjacent the at least one frangible wall of both internal chambers.

10. The three-dimensional object of claim 1, wherein the three-dimensional object comprises two channels, each channel extending inwardly from an opposite outer surface of the light polymerized body toward the internal chamber, wherein the internal chamber comprises two frangible walls and at least a portion of each channel is adjacent to a respective frangible wall.

11. The three-dimensional object of claim 1, wherein the three-dimensional object comprises an electrical connector, an electronic device housing, a biomedical device, a mechanical device housing, a bushing or gasket, or a fastener.

12. The three-dimensional object of claim 1, wherein the light polymerized body, the at least one frangible wall, and the curable component are formed from a single polymerizable liquid.

13. A method of bonding an insertable object to a three-dimensional object, the method comprising:
provproviding a three-dimensional object comprising:
a light polymerized body;
at least one internal chamber residing within the light polymerized body, the at least one internal chamber having at least one frangible wall;
a curable component contained within the at least one internal chamber; and
at least one channel extending inwardly from an outer surface of the light polymerized body toward the internal chamber and at least a portion of the at least one channel being adjacent to the at least one frangible wall of the at least one internal chamber,
wherein the light polymerized body is produced from a polymerizable resin consisting of said curable component by the process of bottom-up or top-down stereolithography, and wherein the at least one internal chamber and curable component are produced by under-exposing the region defining the internal chamber during said stereolithography;
inserting an insertable object into the at least one channel and breaking through the at least one frangible wall of the at least one internal chamber;
contacting the insertable object with the curable component contained within the internal chamber; and
curing the curable component and the light polymerized body to bond the insertable object to the three-dimensional object.

14. The method according to claim 13, wherein curing the curable component and the light polymerized body comprises exposing the curable component and the light polymerized body to heat, microwave irradiation, or combinations thereof.

15. The method according to claim 13, wherein the insertable object comprises a removeable plug, and the method further comprises removing the removeable plug from the insertable object after the insertable object is inserted into the at least one channel and has broken through the at least one frangible wall of the at least one internal chamber.

16. The method according to claim 13, wherein the three-dimensional object comprises two channels, and the method further comprises inserting a second insertable object into the second channel and breaking through the at least one frangible wall of the at least one internal chamber.

17. A three-dimensional object produced by a method of bonding an insertable object to the three-dimensional object, the method comprising:
providing a three-dimensional object comprising:
a light polymerized body;
at least one internal chamber residing within the light polymerized body, the at least one internal chamber having at least one frangible wall;
a curable component contained within the at least one internal chamber; and
at least one channel extending inwardly from an outer surface of the light polymerized body toward the internal chamber and at least a portion of the at least one channel being adjacent to the at least one frangible wall of the at least one internal chamber,
wherein the light polymerized body is produced from a polymerizable resin consisting of said curable component by the process of bottom-up or top-down stereolithography, and wherein the at least one internal chamber and curable component are produced by under-exposing the region defining the internal chamber during said stereolithography;
inserting an insertable object into the at least one channel and breaking through the at least one frangible wall of the at least one internal chamber;
contacting the insertable object with the curable component contained within the internal chamber; and
curing the curable component and the light polymerized body to bond the insertable object to the three-dimensional object.

\* \* \* \* \*